(12) United States Patent
Starr et al.

(10) Patent No.: US 9,504,340 B2
(45) Date of Patent: Nov. 29, 2016

(54) FOOD CARRIER

(75) Inventors: David Starr, Woodridge, IL (US);
Bruce Konen, Sugar Grove, IL (US);
Mason Uhmholtz, Chicago, IL (US);
Catherine Franczyk, Woodridge, IL (US); Sarah Mault, Woodridge, IL (US)

(73) Assignee: Wilton Industries Inc., Woodridge, IL (US)

( * ) Notice: Subject to any disclaimer, the term of this patent is extended or adjusted under 35 U.S.C. 154(b) by 0 days.

(21) Appl. No.: 14/112,194

(22) PCT Filed: Apr. 17, 2012

(86) PCT No.: PCT/US2012/033958
§ 371 (c)(1),
(2), (4) Date: Jun. 27, 2014

(87) PCT Pub. No.: WO2012/145329
PCT Pub. Date: Oct. 26, 2012

(65) Prior Publication Data
US 2014/0299607 A1    Oct. 9, 2014

Related U.S. Application Data

(60) Provisional application No. 61/476,637, filed on Apr. 18, 2011.

(51) Int. Cl.
*A47J 47/00*     (2006.01)
*A47G 19/02*     (2006.01)
(Continued)

(52) U.S. Cl.
CPC ............... *A47G 19/02* (2013.01); *A47J 47/00* (2013.01); *A47J 47/14* (2013.01); *B65D 85/36* (2013.01)

(58) Field of Classification Search
CPC ............................... A47J 47/00; A47G 19/02
USPC ............ 220/574, 784, 788, 324; 211/77, 78
See application file for complete search history.

(56) References Cited

U.S. PATENT DOCUMENTS 3,211,288 A    5/1970  Swett
4,197,940 A    4/1980  DeRossett
(Continued)

FOREIGN PATENT DOCUMENTS

DE    2020100 01 881 U1    5/2010
JP        49-139154 U      11/1974
(Continued)

OTHER PUBLICATIONS

International Preliminary Report on Patentability and Written Opinion of International Search Authority, PCT/US2012/033958, dated Oct. 22, 2013, 4 pages.

(Continued)

*Primary Examiner* — Anthony Stashick
*Assistant Examiner* — Raven Collins
(74) *Attorney, Agent, or Firm* — Foley & Lardner LLP (57) ABSTRACT

A food carrier configured for use in decorating, storing, serving and transporting food in a single device. The food carrier includes a turntable base having a body and a rotating member that rotates about a central axis relative to the body, a serving platter configured to removably secure to the turntable base; and a lid configured to engage the turntable base. The turntable base has a plurality of locking mechanisms to secure the rotating member relative to the body. The lid may be lockable to the turntable base by at least one locking mechanism.

12 Claims, 11 Drawing Sheets

(51) Int. Cl.
    *A47J 47/14*     (2006.01)
    *B65D 85/36*     (2006.01)

(56) References Cited

U.S. PATENT DOCUMENTS

| | | | |
|---|---|---|---|
| 4,817,799 A * | 4/1989 | Gregerson et al. | 206/445 |
| 5,307,647 A | 5/1994 | McClure | |
| 5,487,600 A | 1/1996 | Griffin | |
| D522,813 S * | 6/2006 | Swinford et al. | D7/610 |
| 2003/0155317 A1* | 8/2003 | McNeeley et al. | 211/78 |
| 2006/0130677 A1 | 6/2006 | Chou | |
| 2008/0251675 A1* | 10/2008 | Amato | F16M 11/08 248/349.1 |

FOREIGN PATENT DOCUMENTS

| | | |
|---|---|---|
| JP | 63-186278 | 11/1988 |
| JP | 64-4275 U | 1/1989 |
| JP | S64-004275 | 1/1989 |
| JP | 53-000351 | 1/1998 |
| JP | S49-139154 | 3/1998 |
| JP | 11-245981 | 9/1999 |
| JP | 2006-206066 | 8/2006 |
| JP | 2006-225040 | 8/2006 |
| WO | WO-2006/077678 | 7/2006 |

OTHER PUBLICATIONS

Abstract of JP11-245981 English translation from www.lexisnexis.com/totalpatent, dated Nov. 21, 2013, 8 pages.
Portable Cake Caddy, https://www.wilton.com, dated Nov. 25, 2013, 1 page.
Jumbo Cake Saver, https://www.wilton.com, dated Nov. 25, 2013, 1 page.
First Examination Report for New Zealand application No. 616738, dated Jun. 11, 2014, 2 pages.
Office Action for Australian Application No. 2012245594, dated Apr. 21, 2015, 3 pages.
Extended European Search Report for European Application No. 12774871.3; dated Jan. 28, 2015; 7 pages.
First Chinese Office action for Application No. 20128029961.4, Dated Feb. 2, 2015, 18 pages with English Translation.
First Office Action for Mexican Application No. MX/a/2013/012055, dated Sep. 9, 2015, 4 pages.
Second Examination Report for Australian Application No. 2012245594, dated Oct. 13, 2015, 4 pages.
Examination Report for New Zealand Application No. 616738, dated Sep. 23, 2015, 1 page.
Second Mexican Office Action with English summary for Mexican Application No. MX/a/2013/012005, mail date Apr. 18, 2016, 6 pages.
Notice of Reasons for Rejection for Japanese App. No. 2014-506489, dated Nov. 25, 2014, 7 pages.
Second Chinese Office Action with English Translation for Application No. 201280029961.4, mailed Dec. 4, 2015, 7 pages.

\* cited by examiner

FOOD CARRIER

CROSS-REFERENCE TO RELATED APPLICATIONS

The present application is a U.S. National Stage of International Patent Application No. PCT/US2012/033958, filed Apr. 17, 2012, which claims priority to U.S. Provisional Application No. 61/476,637, filed Apr. 18, 2011. The foregoing applications are incorporated by reference herein in their entireties.

BACKGROUND

The present application relates to systems and methods for transporting food products. Specifically, the present application relates to a cake caddy.

Cake decorators often decorate and serve a cake in different locations. Typically, the cake is decorated on a turntable. After the cake is decorated, the cake decorator must pick up the cake and place the cake on a serving platter or in a caddy to be stored and/or transported to the location where the cake will be served. The use of multiple products in this process often results in damage to the cake.

A need exists for improved technology, including technology that may address the above described disadvantage.

SUMMARY

One embodiment of the invention relates to a food carrier configured for use in decorating, storing, serving and transporting food in a single device. The food carrier includes a turntable base having a body and a rotating member that rotates about a central axis relative to the body, a serving platter configured to removably secure to the turntable base; and a lid configured to engage the turntable base. The turntable base has a plurality of locking mechanisms to secure the rotating member relative to the body. The lid may be lockable to the turntable base by at least one locking mechanism.

In this embodiment, the bottom of the turntable base may be configured to stack upon and engage with a top of the lid to create an elevated stand.

In this embodiment, the bottom of the turntable base may be configured to stack upon and engage with a top of the lid to create an elevated stand.

In this embodiment, the bottom of the turntable base of one food carrier may be configured to stack upon and engage with a top of the lid of another food carrier.

In this embodiment, the rotation locking mechanism may be comprised of a plurality of latches configured to engage with a portion of a base of the lid to secure the rotating member relative to the body.

In this embodiment, the rotation locking mechanism may be comprised of a plurality of latches configured to engage with a top portion of the rotating member to secure the rotating member relative to the body.

In this embodiment, the rotation locking mechanism may engage with the base of the lid at any location along a circumference of the base of the lid.

In this embodiment, the rotation locking mechanism may engage with the top portion of the rotating member at any location along a circumference of the top portion of the rotating member.

In this embodiment, a rotation of the rotating member may be achieved with a ball bearing.

In this embodiment, the bottom of the serving platter may have a plurality of protrusions configured to secure to a plurality of grooved portions on the turntable base.

In this embodiment, a height of the lid may be at least four inches.

In this embodiment, the lid may have a dome shape.

In this embodiment, the food carrier may further include a handle configured for carrying the food carrier, the handle attached to a top of the lid.

In this embodiment, the food carrier may be configured for use in decorating, storing, serving and transporting food.

In another embodiment, a food carrier includes a turntable base having a body and a rotating member that is rotatable about a central axis relative to the body, a serving platter configured to removably secure to the rotating member, and a rotation locking mechanism connected to the body and engageable with the rotating member to prevent rotation of the rotating member about the central axis relative to the body.

In this embodiment, the food carrier may further include a lid configured to engage the turntable base, the lid lockable to the turntable by the rotation locking mechanism.

In this embodiment, the rotation locking mechanism may include a plurality of latches configured to engage with a portion of a base of the lid to secure the rotating member relative to the body.

In this embodiment, the rotation locking mechanism may engage with the base of the lid at any location along a circumference of the base of the lid.

In this embodiment, the rotation locking mechanism may engage with the top portion of the rotating member at any location along a circumference of the top portion of the rotating member.

In this embodiment, the rotation locking mechanism may include a plurality of latches configured to engage with a top portion the rotating member to secure the rotating member relative to the body.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As illustrated in FIGS. 1-10, a food carrier 100 comprises a lid 1 with a handle 5, a serving platter 2, a body 4 with a rotating member 3, and latches 9. The term "turntable base 17" will be used to describe a combination of the body 4 and the rotating member 3. The food carrier 100 is multi-functional. For example, the food carrier 100 may be used transport any suitable food, preferably, cake. In another example, the food carrier 100 may also serve as a cake decorating stand. In yet another example, the food carrier 100 may also serve as a cake decorating turntable.

Figure 1:
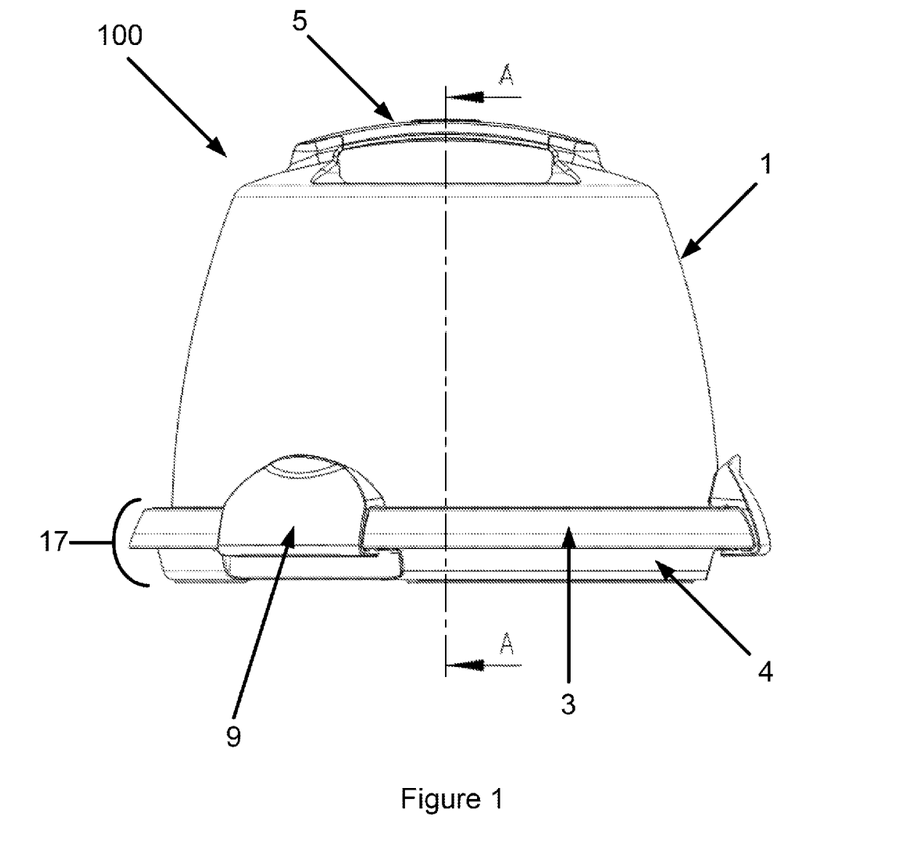
FIG. 1 is a front elevational view of an exemplary embodiment of a food carrier.
Figure 2:
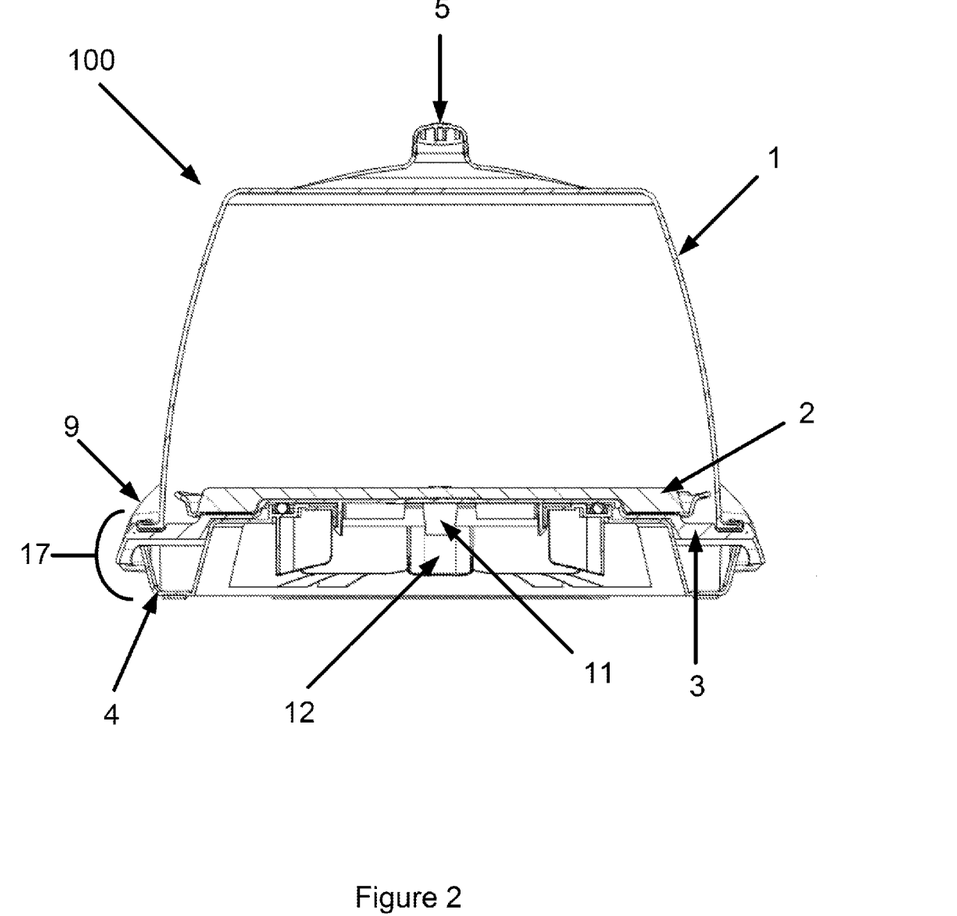
FIG. 2 a cross sectional view of the food carrier of FIG. 1 through section A-A.
Figure 3:
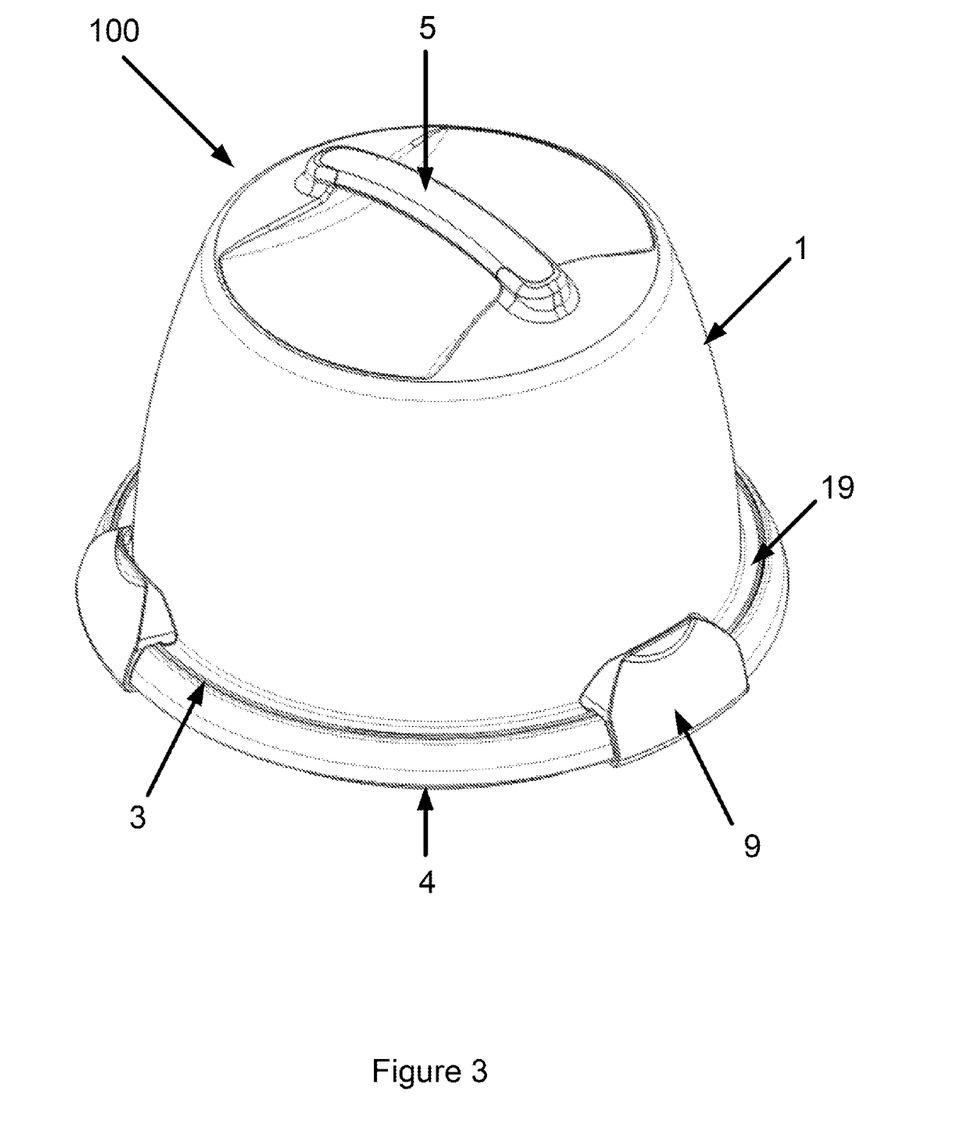
FIG. 3 is a perspective view of the food carrier of FIG. 1.
Figure 4:
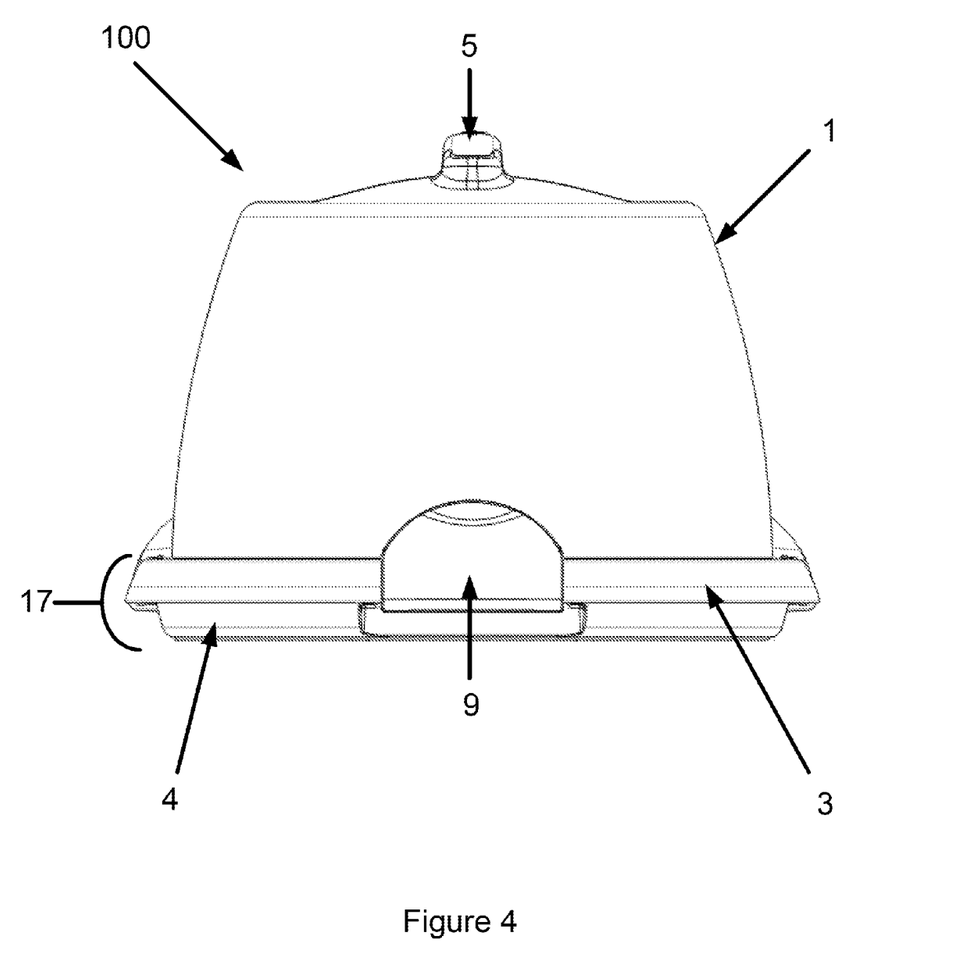
FIG. 4 is a left side elevational view of the food carrier of FIG. 1.
Figure 5:
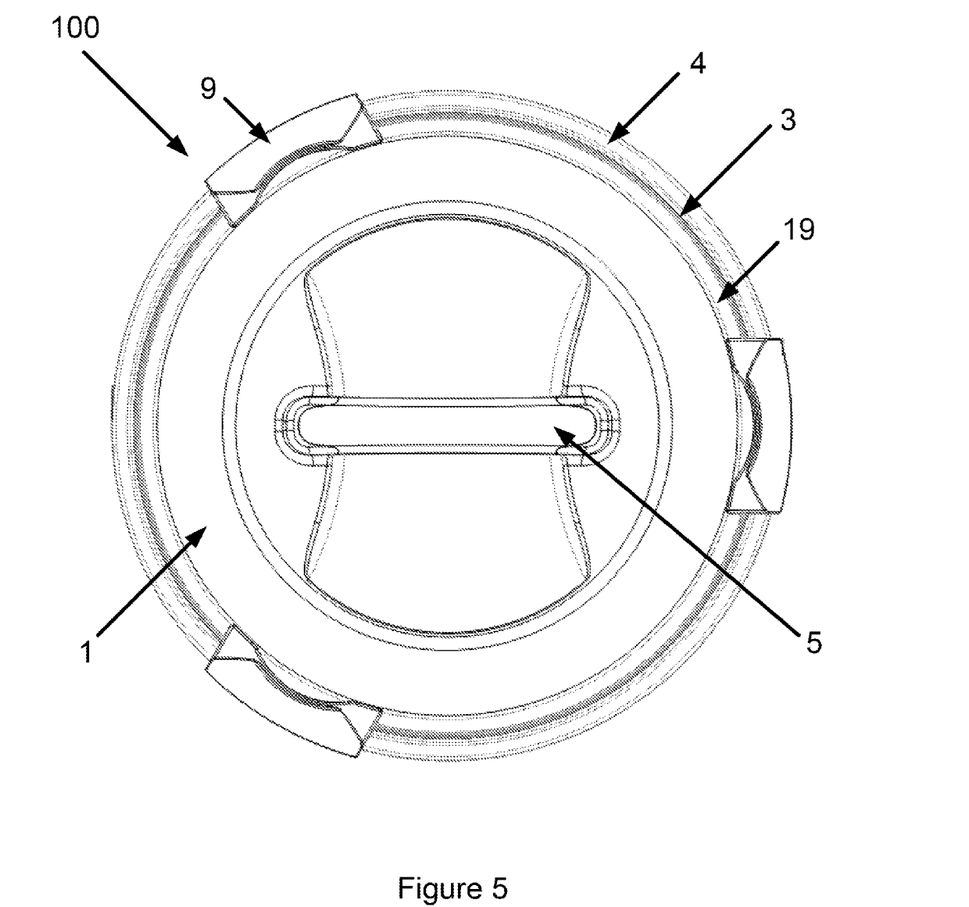
FIG. 5 is a top plan view of the food carrier of FIG. 1.

The lid 1 of the food carrier 100 may be any color. In addition, the lid 1 may be opaque or transparent. The lid 1 is made of any suitable non-skid material, for example, plastic. The non-skid material allows an outside surface of lid 1 to be used as a cake decorating stand. In one embodiment, the lid 1 has a dome shape. In alternative embodiments, the lid 1 may have a cubic or cylindrical shape. The lid 1 can be any height, preferably, 4 inches to accommodate a 4-inch decorated cake.

A top of lid 1 is connected to a handle 5. The handle 5 is configured to allow a user to easily carry the food carrier 100 from one location to another. The handle 5 may be any color. In addition, the handle 5 may be opaque or transparent. The handle 5 may be made of any suitable material, for example, plastic.

In one embodiment, at a bottom of lid 1 is a ring 6. A top of the ring 6 is configured to fit within a grooved portion at the bottom of lid 1. A bottom of the ring 6 is configured to secure to a groove in a top portion of the rotating member 3. An inner diameter of ring 6 may be slightly larger than an outer diameter of a base of the serving platter 2.

The food carrier 100 includes the serving platter 2. The serving platter 2 is engageable with the turntable base 17. A bottom of the serving platter 2 contains a plurality of protrusions 15 (see FIG. 10) configured to interface with a plurality of grooved portions 16 (see FIG. 7) on a top of the rotating member 3. The serving platter 2 is configured to support the cake during decorating the cake upon the turntable base 17. The serving platter 2 may be removable such that the cake may be taken out of the food carrier 100 and displayed or served without having to transfer the cake to a separate platter. The serving platter 2 has a raised edge to allow a user to easily remove the serving platter 2 from the turntable base 17.

Figure 7:
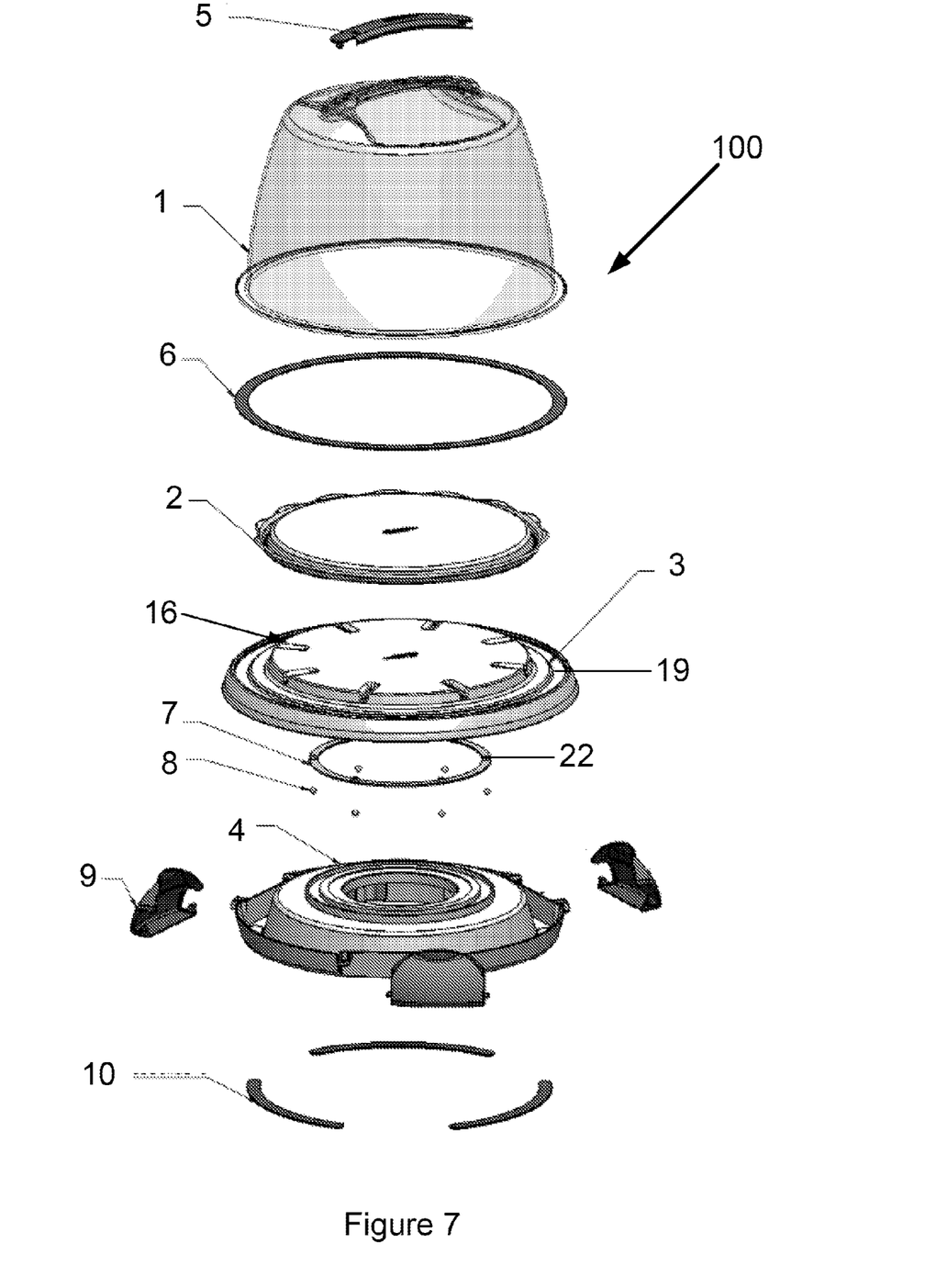
FIG. 7 is an exploded view of the food carrier of FIG. 1.
Figure 8:
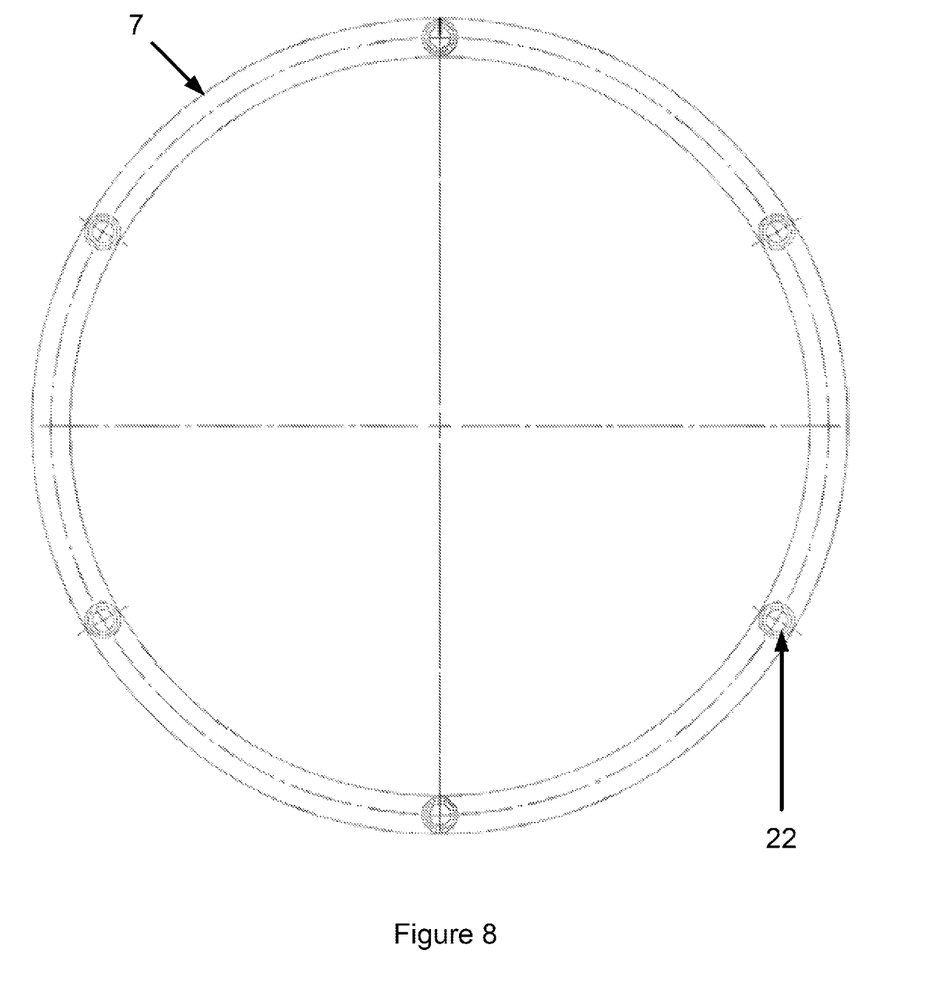
FIG. 8 is a top view of a rotating mechanism of a turntable of the food carrier of FIG. 1.

The food carrier 100 further includes the turntable base 17 comprised of the body 4 and the rotating member 3. A protrusion 11 of the rotating member 3 engages with a recessed portion 12 of the body 4 (see FIG. 2) to secure the rotating member 3 to the body 4. The rotating member 3 of the turntable base 17 is rotatable with respect to the body 4. In one embodiment, as seen in FIGS. 7-8, a rotating member ring 7 has a plurality of concave grooves 22 configured to engage with a plurality of balls 8 to form a ball bearing. The rotating member 3 lays upon the ball bearing formed by rotating member ring 7 and balls 8 to allow the rotating member 3 to rotate. In one embodiment, when placed on a surface, the body 4 does not rotate relative to the surface, but the rotating member 3 is rotatable relative to the surface, and thus to a user.

Figure 9A:
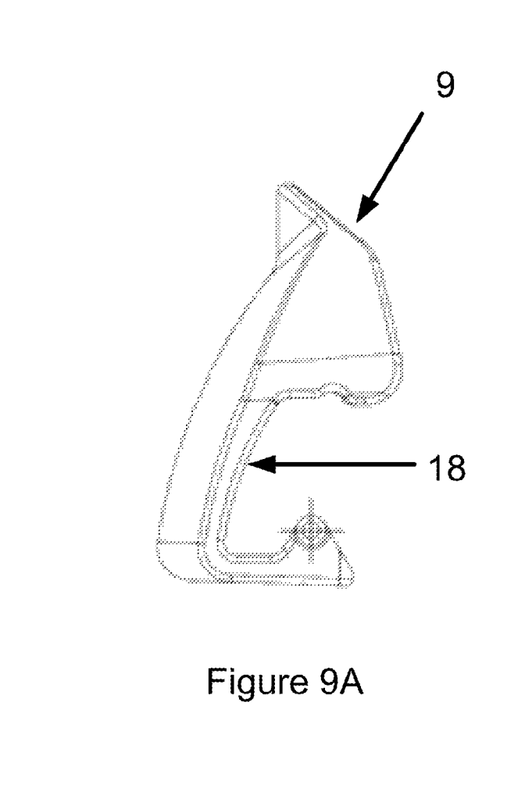
FIG. 9A is a side view of a latch of the food carrier of FIG. 1.
Figure 9B:
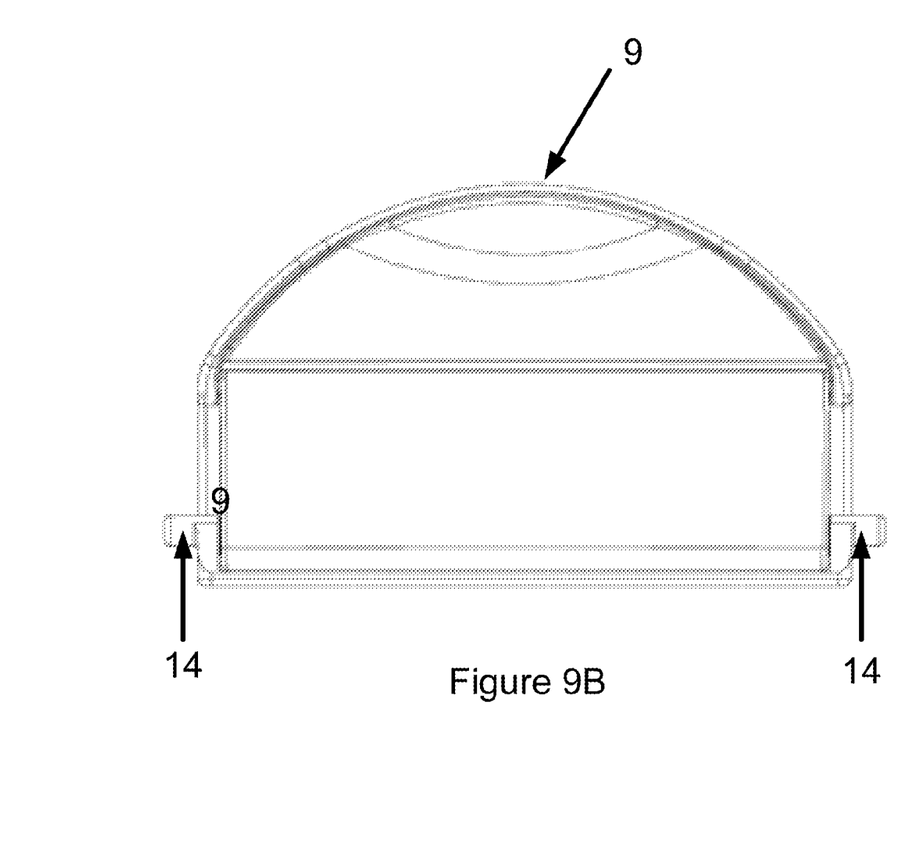
FIG. 9B is a back view of the latch of FIG. 9A.
Figure 10:
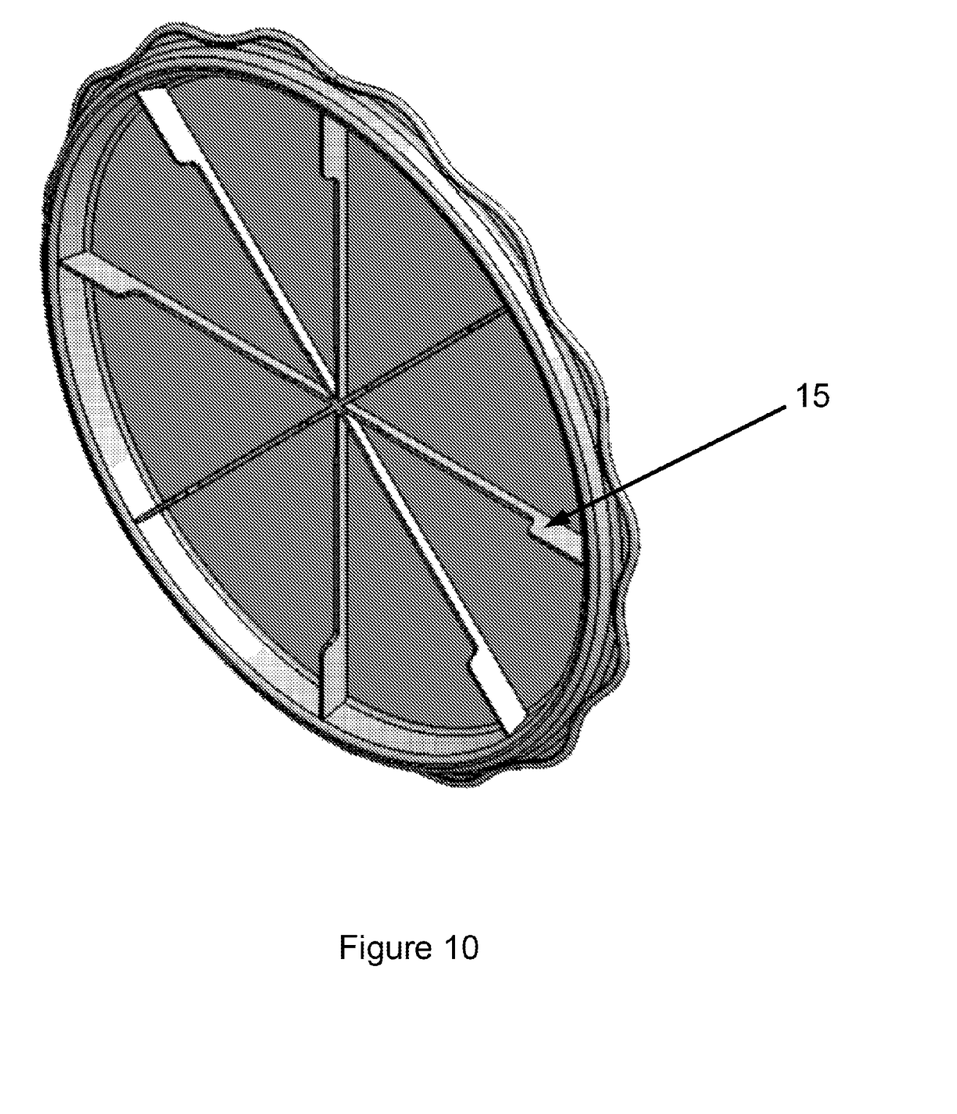
FIG. 10 is an isometric bottom view of a serving platter of the food carrier of FIG. 1.

The body 4 includes a locking mechanism comprised of latches 9. The latches 9 may prevent the rotating member 3 from rotating by engaging with the lid 1. Alternatively, the latches 9 may prevent the rotating member 3 from rotating, even when the lid 1 is not present, by engaging with the rotating member 3. As seen in FIGS. 9A-9B, the latches 9 are attached to the body 4 by mounting pin locations 14 that are mountable to the body 3 of the turntable base 17. The latches 9 have a grooved portion 18 configured to engage with a portion of the lid 1 that is in contact with ring 6. The grooved portion 18 is also configured to engage with a grooved portion 19 of the rotating member 3. Thus, the latches 9 may be used with the lid or without the lid to secure the serving platter 2. Rotation is prevented due to friction between the latches 9 and the rotating member 3. The latches 9 are omnidirectional in that the latches 9 may engage with any portion of the lid 1 or the rotating member 3. In other words, the latches 9 do not have to engage with the lid 1 or the rotating member 3 at a certain location in order to prevent rotation. Any number of latches 9 may be used, for example, three latches 9 (see FIG. 5). A user may wish to prevent the turntable base 17 from rotating, for example, during transportation or while decorating a portion of the cake. The latches 9 may also retain the lid 1, such that a user is able to carry the container by the handle 5.

Figure 6:
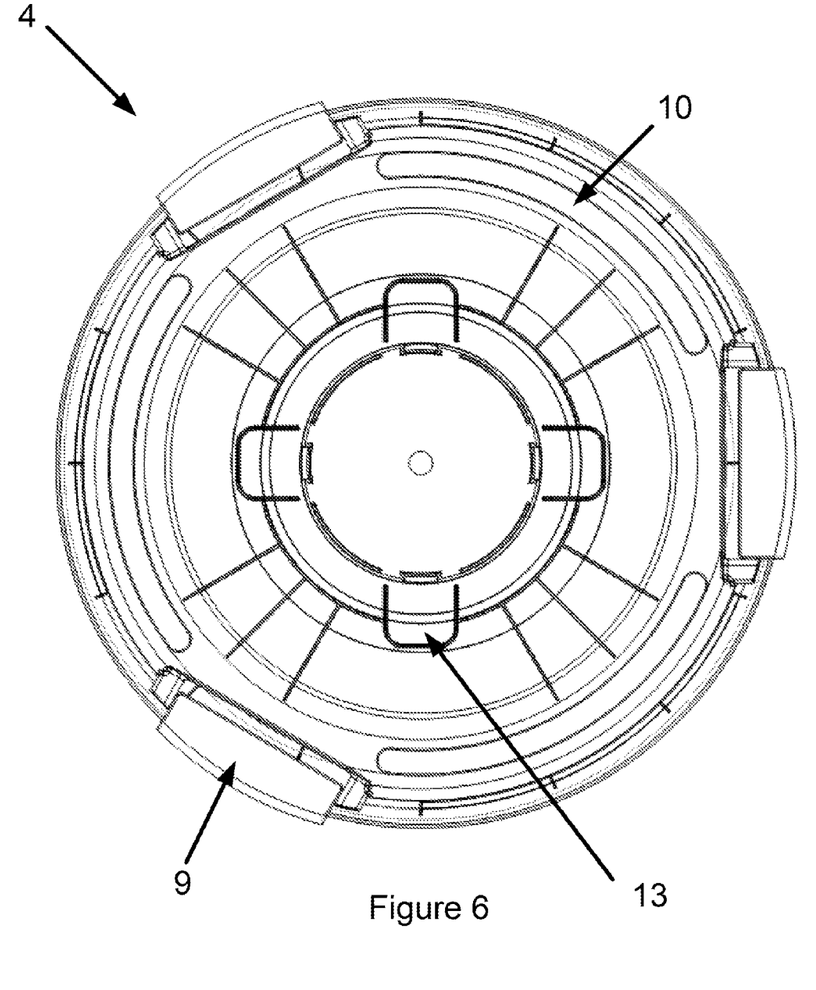
FIG. 6 is a bottom plan view of the food carrier of FIG. 1.

Referring now to FIG. 6, a bottom of the body 4 includes a plurality of bosses 13. Any number of bosses 13 may be utilized, for example, four bosses. The bosses 13 are configured to interface with the handle 5 on a top of the lid 1 such that a plurality of food carriers 100 may be securely stacked. Alternatively, the turntable base 17 (e.g. rotating member 3 and body 4) may be placed on top of the lid 1 such that the lid 1 can be used to elevate the turntable base 17 to facilitate cake decorating or presentation. The bottom of the body 4 also includes non-skid portions 10. The non-skid portions 10 may be made of any suitable material, for example rubber. The non-skid portions 10 are configured to prevent the food carrier from sliding, for example, while a user is decorating a cake.

Figure 11:
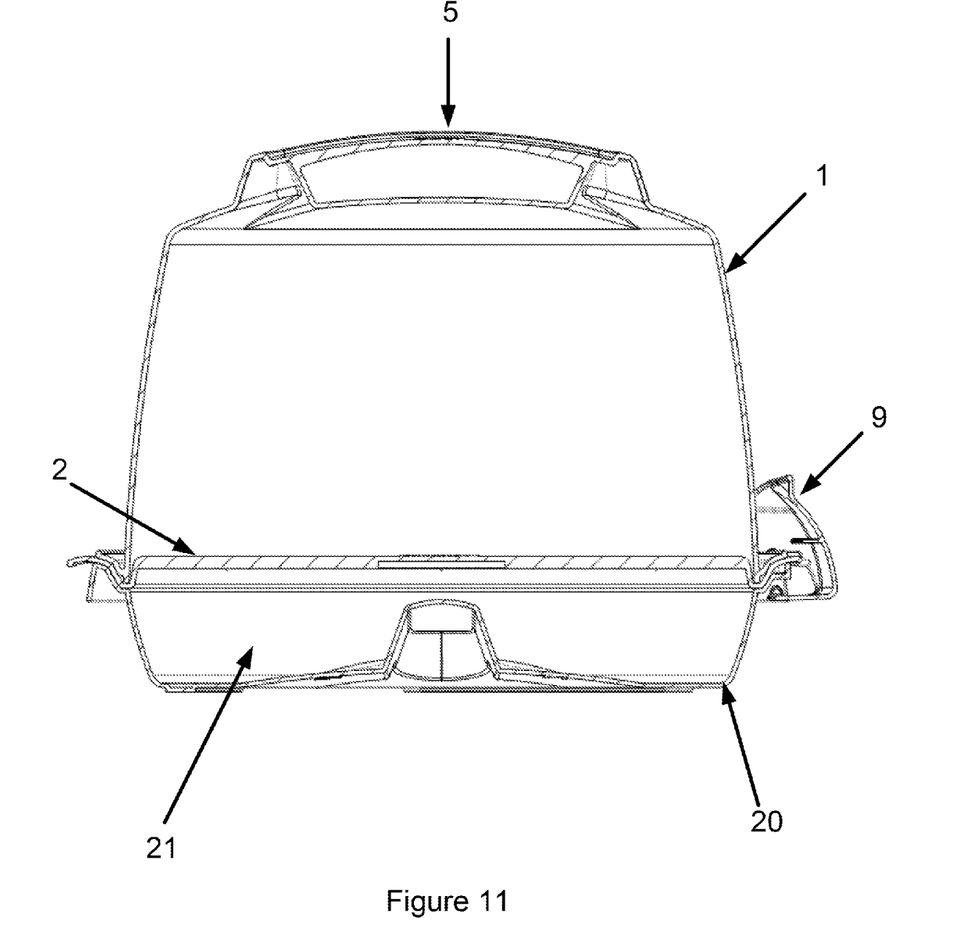
FIG. 11 is a cross sectional view of another exemplary embodiment of a food carrier.

The configuration of the food carrier 100 allows a user to decorate, store, serve and transport food, preferably cake, in a single device, rather than having to transfer the food between multiple devices. In one embodiment best illustrated in FIG. 11, the food carrier 100 includes a storage base 20 that is engagable with a serving platter 2 and with a lid 1. The serving platter 2 may be secured to the storage base 20 via locking mechanism such as latches 9 that extend from the storage base 20. The latch 9 may secure the serving platter 2 to the storage base 20 directly. Alternatively, the latch 9 may secure the lid 1 against the serving platter 2 which is in turn secured against the storage base 20. A storage cavity 21 is defined within the storage base 20 and bounded by the serving platter 2.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A food carrier comprising:
   a turntable base having a body and a rotating member, the rotating member rotatable about a central axis relative to the body;
   a serving platter configured to removably secure to the turntable base;
   a lid configured to engage the turntable base; and
   a rotation locking mechanism connected to the body and engageable with the lid in a first position and with the rotating member in a second position,
   wherein, when the rotation locking mechanism is engaged in the first position or the second position, the rotating member is prevented from rotating about the central axis relative to the body.

2. The food carrier of claim 1, wherein a bottom of the turntable base is configured to stack upon and engage with a top of the lid to create an elevated stand.

3. The food carrier of claim 1, wherein a bottom of the turntable base of one food carrier is configured to stack upon and engage with a top of the lid of another food carrier.

4. The food carrier of claim 1, wherein the rotation locking mechanism comprises a plurality of latches.

5. The food carrier of claim 1, wherein the rotation locking mechanism is configured to engage with a base of the lid at any location along a circumference of the base of the lid.

6. The food carrier of claim 1, wherein the rotation locking mechanism is configured to engage with a top portion of the rotating member at any location along a circumference of the top portion of the rotating member.

7. The food carrier of claim 1, wherein a rotation of the rotating member is achieved with a ball bearing.

8. The food carrier of claim 1, wherein a bottom of the serving platter has a plurality of protrusions configured to secure to a plurality of grooved portions on the turntable base.

9. The food carrier of claim 1, wherein a height of the lid is at least four inches.

10. The food carrier of claim 1, wherein the lid has a dome shape.

11. The food carrier of claim 1, further comprising a handle configured for carrying the food carrier, the handle attached to a top of the lid.

12. The food carrier of claim 1, wherein the food carrier is configured for use in decorating, storing, serving and transporting food.

* * * * *